No. 759,973. PATENTED MAY 17, 1904.
A. L. DUDLEY.
STUFFING BOX.
APPLICATION FILED SEPT. 12, 1903.
NO MODEL.
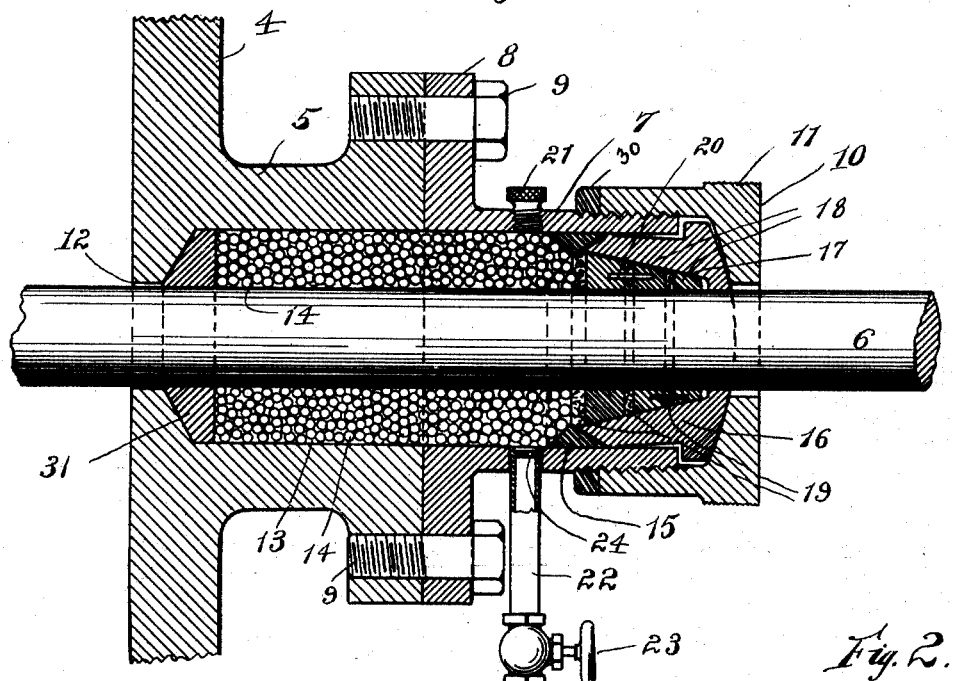
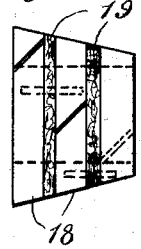
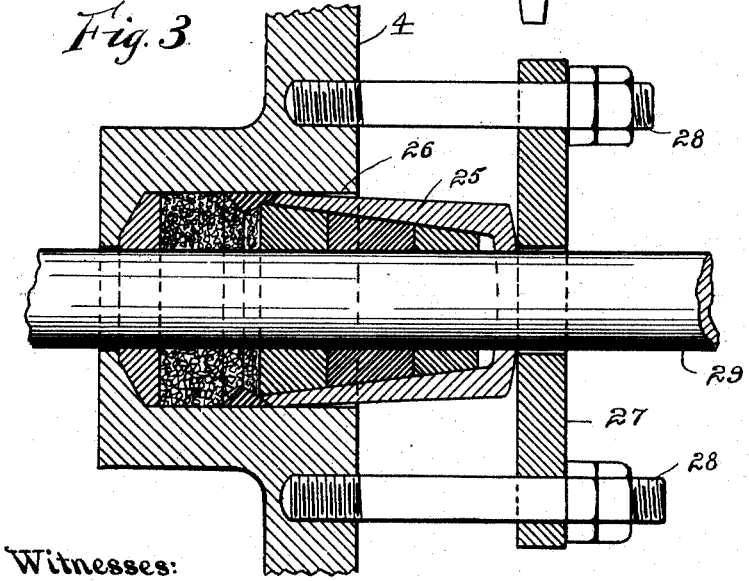
Witnesses:
E. H. Arnold.
M. C. Siktberg.
Inventor,
Archie L. Dudley,
By Glenn S. Noble
Att'y.

No. 759,973.

Patented May 17, 1904.

UNITED STATES PATENT OFFICE.

ARCHIE L. DUDLEY, OF CHICAGO, ILLINOIS.

STUFFING-BOX.

SPECIFICATION forming part of Letters Patent No. 759,973, dated May 17, 1904.

Application filed September 12, 1903. Serial No. 172,873. (No model.)

*To all whom it may concern:*

Be it known that I, ARCHIE L. DUDLEY, a citizen of the United States, residing at Chicago, in the county of Cook and State of Illinois, have invented certain new and useful Improvements in Stuffing-Boxes, of which the following is a specification.

This invention relates more particularly to stuffing-boxes or packing devices whereby a tight joint is made between a reciprocating or revolving rod, shaft, or the like and a fluid-receptacle within which the rod projects, such as piston-rods, valve-rods, or equivalent devices. Its objects are to provide a substantially steam-tight or fluid-tight box within which the shaft may operate with as little friction as possible, to provide means for supplying a lubricant to the shaft and means whereby the shaft may be allowed a certain amount of play without loosening the packing, and such other objects as will appear in the following description.

This invention consists in the combination, with the moving shaft and stationary part, of such novel packing devices and adjusting means, as will appear hereinafter.

In the drawings accompanying this specification, Figure 1 is a longitudinal sectional view showing a complete stuffing-box embodying this invention. Fig. 2 is a view showing the packing-rings. Fig. 3 is a view showing a modified form of construction.

As illustrated in the drawings, 4 represents the head of an engine's cylinder, which is provided with a box 5 for the piston-rod 6. A tubular member 7, having a flange 8, is secured to the box 5 by means of bolts 9 and forms substantially a continuation thereof. The joint between the box and the flange 8 is made tight in any suitable manner. The outer end of the tubular member 7 is threaded to receive a cap 10, which is knurled at 11 for convenience in turning and is locked by means of a lock-ring 30.

Referring now to the devices forming the packing, a junk-ring 31 is placed over the piston where it passes through the hole 12 in the head of the cylinder in order to form a closer fit than is usually made between the rod and the hole. This ring is shaped to conform with the usual form of the wall at the end of the cylindrical opening 13 through the box 5 and extension 7. This opening is filled around the rod 6 for a distance with shot or spherical balls 14 or grains which may be formed of any desired metal, but preferably of some antifriction compound. This shot may be compressed longitudinally of the rod by means of the rings and follower, which may be urged into engagement therewith by means of the cap 10. Next to the shot is a ring 15, of a substantially triangular cross-section, having the base in engagement with the cylindrical wall of the extension 7 and presenting a beveled face to the shot. The opposite correspondingly-beveled face is engaged by the beveled or conical end of a follower or gland 16. This gland fits somewhat loosely within the extension 7 and is provided at its outer end with a curved face which is adapted to correspond with the similarly-curved face of the cap 10. It will be noted that the opening through the cap 10 is considerably larger than the rod 6 and will allow for a lateral movement of the same. Within the gland 16 is formed a conical chamber 17, which engages with metallic packing-rings 18, also formed with outer conical surfaces. If desired, fibrous rings 19 may be inserted between the metallic rings 18. The metallic rings are preferably split in the usual manner, as shown in Fig. 2, and in order to insure the proper breaking of the joints dowel-pins 20 may be inserted between the rings. An opening provided with a plug 21 is provided for introducing the lubricating material into the box. It is found in practice that a certain amount of water will form within the shot-filled opening, and in order to discharge this water and to blow out any dirt which may gather about the shot a blow-off pipe 22 is provided, having a valve 23 therein. In order to prevent any shot from being discharged through this pipe, the inner end is provided with small perforations, as shown at 24.

The operation will be readily understood from the foregoing description. The junk-ring being placed in position and the shot poured into the opening 13 and the parts being assembled, the joint may be made as tight as desired by simply turning the cap 10. This presses in on the gland 16, which in turn forces the split rings into engagement with the rod and simultaneously forces the outer corner of the ring 15 in engagement with the extension 7. The pressure of this ring against the shot reacts upon itself and causes the forward projecting corner also to be pressed into engagement with the extension. This ring is preferably made of some yielding material which will form a tight connection. The longitudinal thrust on the shot forces the latter to form an equal pressure around the circumference of the rod and assists in forming a tight joint. When the joint is thus completed, the rod 6 may have a lateral movement in the cap 10 without injuring or loosening the joint, as the gland 16 with the curved outer surface is at all times in close connection with the cap and also with the triangular ring 15 and the packing-rings 18. When the engine is started, it is advisable to occasionally open the valve 23 to allow the steam which may escape through past the ring 31 into the opening 13 to blow out, and thereby discharge any dirt or grit which may have gathered about the shot in the box.

In the modified form of construction shown in Fig. 3 the extension and the cap are done away with and the gland 25 is pressed directly into the box 26 by means of a plate 27 and bolts or studs 28. The opening through the plate 27 is somewhat larger than the shaft 29 to allow for a limited lateral movement of the same, as before described. The box is provided with shot or spheres or grains of metal and with packing-rings, as above described.

While this invention has been described more particularly as applied to an engine, it is not the intention to limit it to this use, as it is adapted to be used under a variety of similar conditions. It is also apparent that modifications in the form of the various parts and changes in the details shown will readily suggest themselves as coming within the scope of this invention, and I do not wish to limit myself to the exact structure shown and described; but

What I claim, and desire to secure by Letters Patent, is—

1. In a stuffing-box, the combination of a shaft adapted to operate through said box, an annular chamber in said box, metallic spheres or grains in said chamber, a ring of triangular cross-section engaging the inner wall of said box, and having one face in engagement with said spheres, a follower adapted to press against said ring and closely fitting the shaft, and means for adjusting the pressure of said follower against said ring, to force the latter against the spheres and its edges against the box.

2. In a device of the character set forth, the combination with a shaft and a box, of a cylindrical member secured to said box and forming an annular chamber around said shaft, metallic spheres in said chamber, a ring of triangular cross-section and of yielding metal, a gland in said tubular member having a beveled face in engagement with said ring, a conical recess in said gland, a plurality of packing-rings in said conical recess having their outer surfaces adapted to conform with said recess, and a cap adapted to engage with said tubular member and said gland, and means for locking said cap.

3. In a stuffing-box, the combination with an annular chamber surrounding the shaft, of spherules filling said chamber, means for introducing a lubricant into said chamber, and means for allowing water or vapor to be discharged from said chamber comprising a blow-off pipe provided with a valve and having its inner end provided with perforations sufficiently small to prevent the discharge of the spherules.

4. In a stuffing-box, the combination with a box provided with an annular chamber around the shaft, spherules filling a portion of said chamber, a ring of substantially triangular cross-section having its base in engagement with the inner wall of said box and having one face in engagement with said spherules, a gland loosely fitting in said box and having its inner end in engagement with the other face of said ring, split packing-rings and fiber rings adapted to engage with the shaft and with a conical recess in said gland, and an adjustable cap provided with an inwardly-curved surface adapted to engage with the outwardly-curved surface of said gland, and to press the latter against said packing-rings and triangular ring which in turn press against the spherules.

5. The combination of a shaft, a box for said shaft having an annular chamber around said shaft, a junk-ring in the bottom of said chamber, spherules partially filling said chamber, a packing-ring of yielding metal and of triangular cross-section engaging said spherules and the inner wall of said chamber, a gland device adapted to press against said ring and said spherules and to fit loosely in said box, and a plate provided with bolts whereby it may be pressed against said gland, said plate being provided with a hole through which the shaft passes, the arrangement being such that the shaft may have a limited lateral movement without disrupting the packing.

6. The combination of a shaft, a box for said shaft having an annular chamber thereabout, a junk-ring in said box, spherules partially filling said box, a ring adapted to be expanded against the inner wall of said box, a follower having an inner conical recess and provided with a beveled edge adapted to press against said ring, split packing-rings having their outer surfaces adapted to engage in said
5 conical recess, dowel-pins for holding said rings in position to break joints, a plate taking over said shaft and having a hole substantially larger than the same, and bolts for pressing said plate against said follower.

ARCHIE L. DUDLEY.

Witnesses:
E. H. ARNOLD,
M. C. SIKTBERG.